(12) United States Patent
Grebovich et al.

(10) Patent No.: US 8,892,869 B2
(45) Date of Patent: Nov. 18, 2014

(54) NETWORK DEVICE AUTHENTICATION

(75) Inventors: Dragan Grebovich, Peabody, MA (US); Kumara Das Karunakaran, Santa Clara, CA (US); Biju Kunjukunju, Cupertino, CA (US)

(73) Assignee: Avaya Inc., Basking Ridge, NJ (US)

( * ) Notice: Subject to any disclaimer, the term of this patent is extended or adjusted under 35 U.S.C. 154(b) by 1260 days.

(21) Appl. No.: 12/343,242

(22) Filed: Dec. 23, 2008

(65) Prior Publication Data

US 2010/0161969 A1 Jun. 24, 2010

(51) Int. Cl.
*H04L 29/12* (2006.01)
*H04L 9/32* (2006.01)
*H04L 29/06* (2006.01)

(52) U.S. Cl.
CPC ............ *H04L 9/3265* (2013.01); *H04L 9/3247* (2013.01); *H04L 63/0823* (2013.01); *H04L 2209/805* (2013.01); *H04L 9/321* (2013.01)
USPC .............................................. 713/156; 726/29

(58) Field of Classification Search
CPC ........... H04L 9/30; H04L 9/32; H04L 9/3202; H04L 9/321; H04L 9/3223; H04L 9/3236; H04L 9/3247; H04L 9/3263; H04L 9/3268; H04L 9/3281; H04L 63/00; H04L 63/08; H04L 63/0823; H04L 63/0876; H04L 2209/80
USPC .......... 726/10, 2–5, 26–27, 29; 713/155–156; 709/217, 219, 227–228; 340/13.26
See application file for complete search history.

(56) References Cited

U.S. PATENT DOCUMENTS

| | | | |
|---|---|---|---|
| 6,134,550 A * | 10/2000 | Van Oorschot et al. ............... 1/1 |
| 6,826,690 B1 * | 11/2004 | Hind et al. ..................... 713/186 |
| 7,254,711 B2 * | 8/2007 | Shigematsu et al. .......... 713/175 |
| 7,545,941 B2 * | 6/2009 | Sovio et al. .................... 380/270 |
| 7,590,840 B2 * | 9/2009 | Langer ........................... 713/156 |
| 8,261,327 B2 * | 9/2012 | Keeler et al. .......................... 726/4 |
| 2004/0070491 A1 * | 4/2004 | Huang et al. ................. 340/10.5 |
| 2004/0158716 A1 * | 8/2004 | Turtiainen et al. ............. 713/172 |
| 2005/0159823 A1 * | 7/2005 | Hayes et al. ..................... 700/19 |
| 2005/0203854 A1 * | 9/2005 | Das et al. ......................... 705/64 |
| 2006/0002556 A1 | 1/2006 | Paul |
| 2007/0079352 A1 | 4/2007 | Klein, Jr. |
| 2007/0106897 A1 * | 5/2007 | Kulakowski .................. 713/171 |
| 2008/0045218 A1 * | 2/2008 | Okochi et al. ................ 455/436 |
| 2008/0077592 A1 | 3/2008 | Brodie et al. |
| 2008/0109654 A1 * | 5/2008 | Hardacker et al. ............ 713/162 |
| 2008/0224823 A1 * | 9/2008 | Lawson et al. ................. 340/5.8 |
| 2008/0238676 A1 * | 10/2008 | Dhillon et al. ............. 340/572.1 |
| 2008/0301307 A1 * | 12/2008 | Son et al. ....................... 709/228 |
| 2010/0141430 A1 * | 6/2010 | Steer ........................ 340/539.13 |

FOREIGN PATENT DOCUMENTS

| | | |
|---|---|---|
| KR | 20040035032 A | 4/2004 |
| WO | 0059225 A1 | 10/2000 |
| WO | 0180528 A2 | 10/2001 |

OTHER PUBLICATIONS

International Search Report for PCT/IB2009/007859, mailed Mar. 24, 2010.

* cited by examiner

*Primary Examiner* — Michael Chao
*Assistant Examiner* — Eric W Shepperd
(74) *Attorney, Agent, or Firm* — Withrow & Terranova, PLLC

(57) ABSTRACT

The present invention relates to using digital certificates to allow network devices to authenticate themselves upon being accepted into and forming part of a communication network.

28 Claims, 12 Drawing Sheets

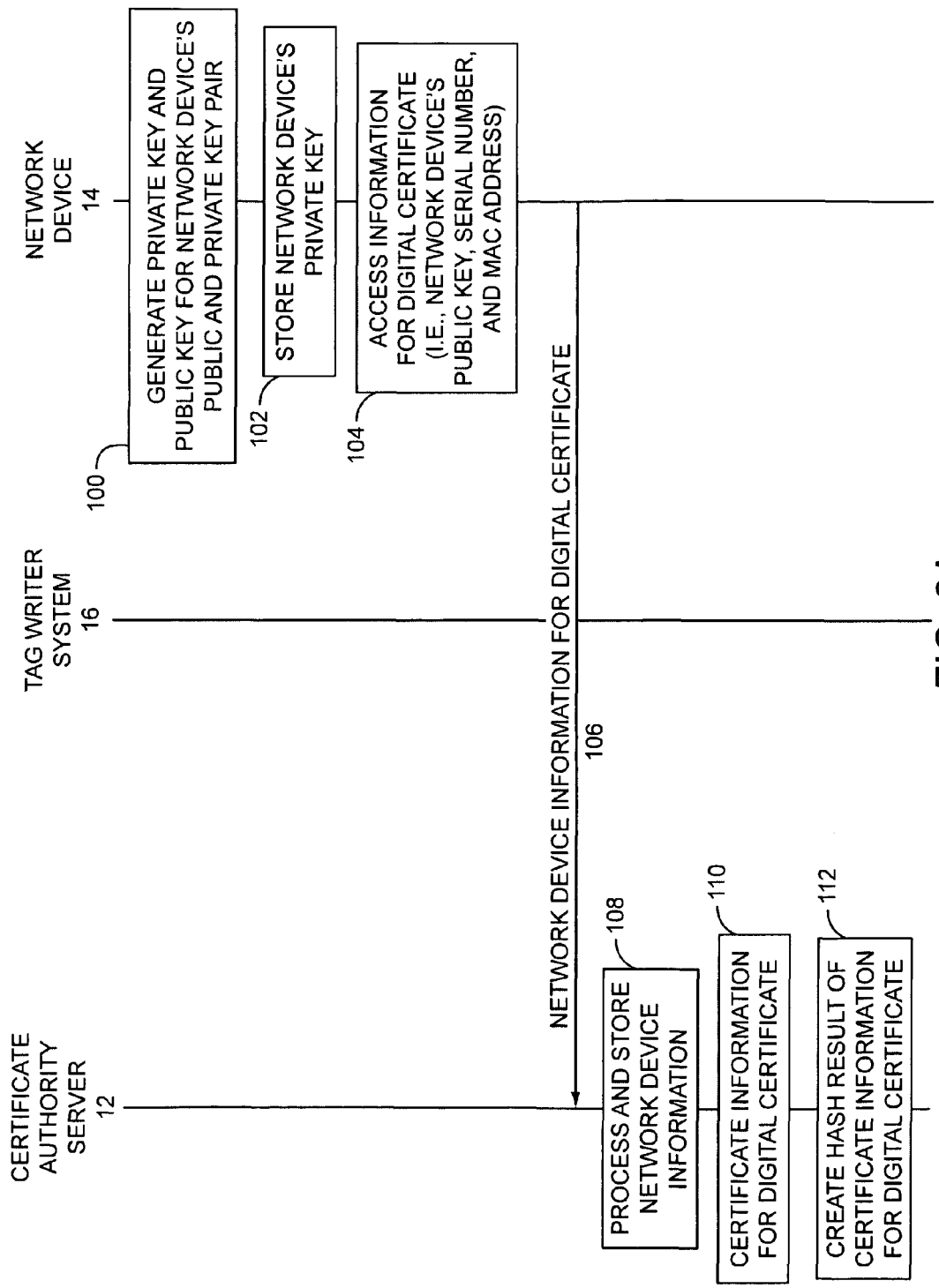

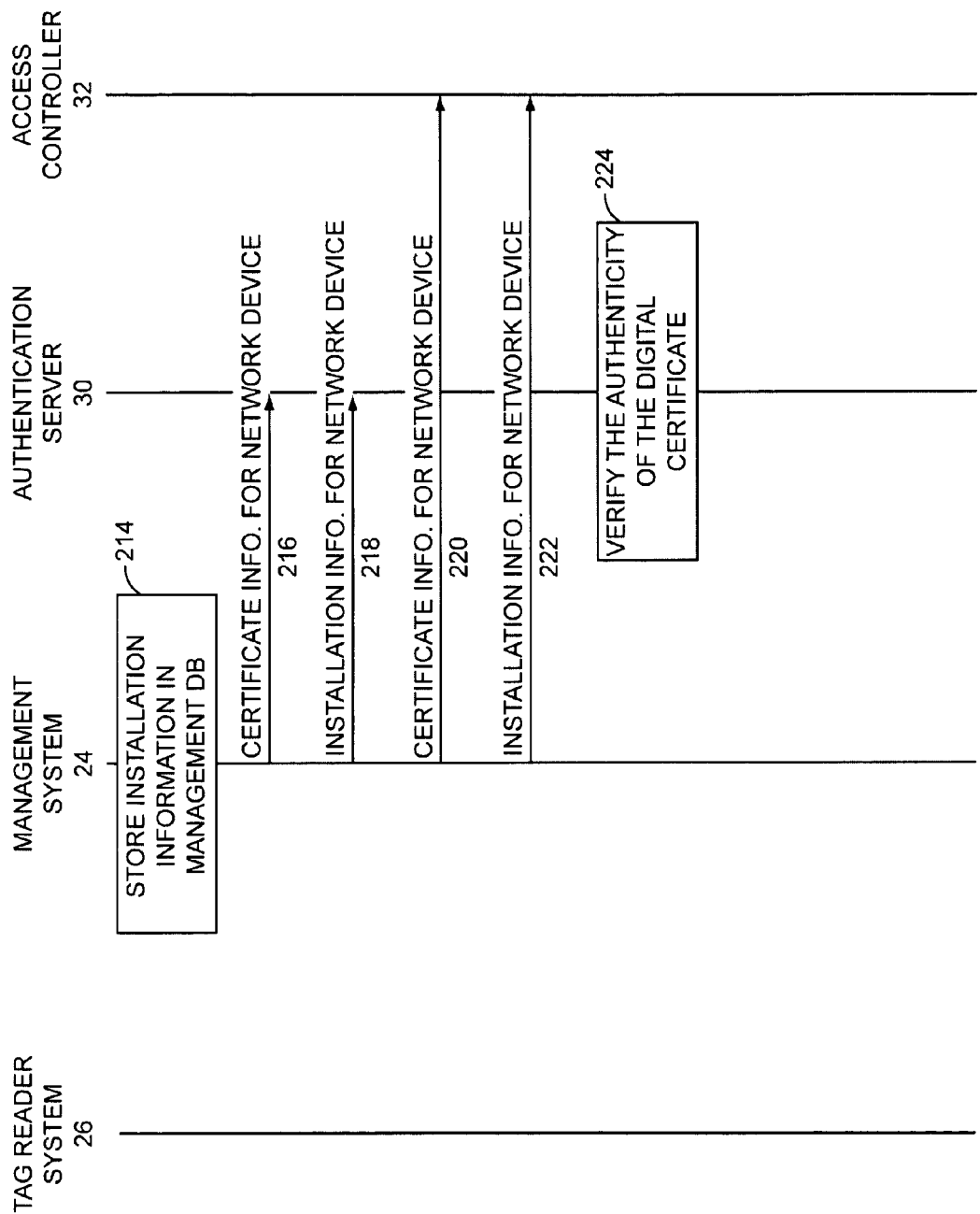

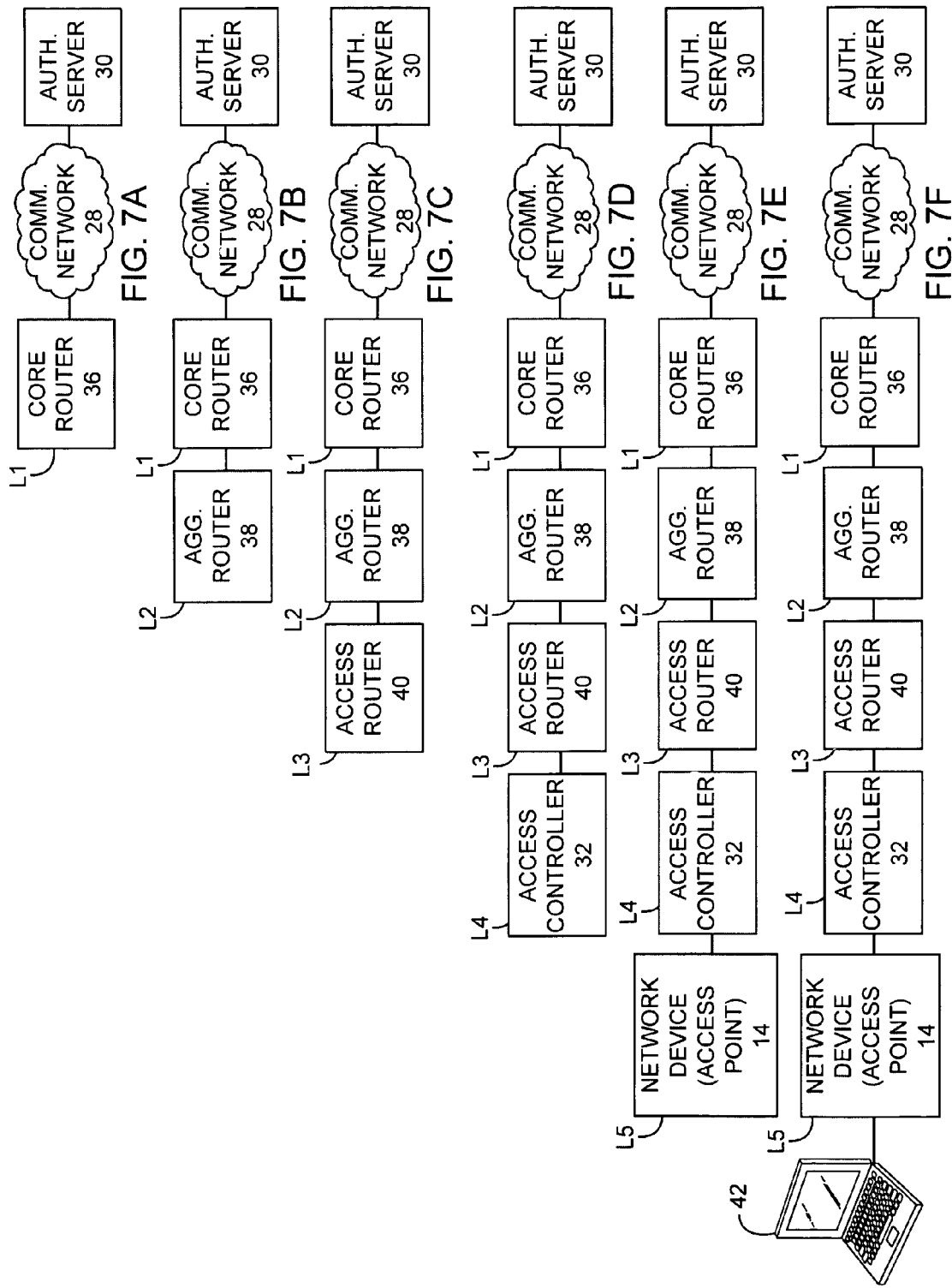

NETWORK DEVICE AUTHENTICATION

FIELD OF THE INVENTION

The present invention relates to a technique for authenticating network devices that are connecting to a communication network, wherein once connected, the network devices form part of the communication network.

BACKGROUND OF THE INVENTION

Cryptography enables users of unsecured networks to exchange information in a secure manner. Most modern cryptography techniques employ algorithms that are based on one or more keys to allow a sender to encrypt information to be transmitted over a network and a receiver to decrypt the encrypted information that was received over the network. Cryptography techniques generally fall into either a secret key cryptography or public key cryptography. In secret key cryptography, the same secret key that is used by the sender to encrypt information is used by the receiver to decrypt the encrypted information provided by the sender. As such, the secret key for private cryptography must be shared and used by both the sender and receiver. If the secret key is discovered or intercepted by a third party, encrypted messages provided by the sender can be readily decrypted by the third party. Since the secret key must be shared, the risk of the secret key being compromised are relatively high and the effort required to keep the secret key confidential is generally overly burdensome. For these reasons, public key cryptography is favored.

Public key cryptography allows users to exchange information over an unsecure network through the use of a public and private key pair, which includes a public key and a private key. Generally, the public and private keys are created simultaneously with a key generation algorithm, such as the well known Rivest, Shamir, and Adleman (RSA) algorithm. Information encrypted using the private key must be decrypted using the corresponding public key, and information encrypted using the public key must be decrypted using the private key. Assume the public and private key pair is allocated to a first party. The private key is not shared and is maintained in confidence by the first party. The public key may be shared with a second party or made publicly available, if so desired. There is a need for the first party to keep the private key confidential, but there is no need for the second party or anyone else to keep the public key confidential.

In operation, the first party will use the private key to encrypt information to send to the second party. Upon receipt of the encrypted information from the first party, the second party will use the public key to decrypt the encrypted information. Further, the second party may use the public key of the first party to encrypt information to send to the first party. Upon receipt of the encrypted information from the second party, the first party will use their private key to the decrypt the encrypted information provided by the second party.

The security of public key cryptography often depends on ensuring that a first party's public key is authentic and that the first party is who they say they are. A digital certificate may include the public key of the first party and information about the first party. When included in a message from the first party, a second party may use the digital certificate to obtain the first party's public key, verify that the public key belongs to the first party, and verify that the first party is who they say they are. Digital certificates are generally created by a trusted certificate authority and provided to the first party by the certificate authority, such that the first party may include the digital certificate with certain messages to other parties. In addition to identity-related information of the first party and the first party's public key, the digital certificate information also may include information about the certificate authority, encryption algorithms, or the digital certificate itself, such as a validity period, expiration date, serial number, and the like. A common digital certificate format is provided in the International Telecommunication Union (ITU) recommendation ITU-T X.509, which is incorporated herein by reference in its entirety.

The integrity of the digital certificate is maintained in part by incorporating a digital signature of the certificate authority. Notably, the certificate authority will have its own public and private key pair, which is different from any public and private key pair of any parties being served by the certificate authority. Typically, the certificate authority's digital signature is created by hashing all or a portion of the digital certificate information to provide a hash result and then encrypting the hash result with the private key of the certificate authority. The hashing process includes processing the digital certificate information by a mathematical function to create a relatively small value, or hash result, that is representative of the digital certificate information. The digital signature is associated with the digital certificate information to provide the digital certificate, which is passed to the first party. The first party may pass the digital certificate to other parties to share their public key and verify who they are.

A second party receiving the first party's digital certificate can use the certificate authority's public key, which is publicly available to the second party, to verify the authenticity of the digital certificate information provided with the digital certificate. The verification process includes three main steps. First, all or a portion of the digital certificate information is hashed to create a hash result. Notably, the same hashing process that was used in generating the digital signature is used during the verification process. Second, the digital signature is decrypted with the certificate authority's public key to obtain a decryption result, and finally, the hash result and the decryption result are compared. The hash result and the decryption result will correspond to each other when the digital certificate information is authentic. The second party may take further steps to ensure the digital certificate was issued from the certificate authority.

Digital certificates have traditionally been associated with and used to authenticate parties, interfaces, and programs; however, they have not been used to authenticate devices, such as network devices that form the core of a communication network. Traditionally, the network devices that make up a communication network are shipped from their manufacturers and manually connected and configured to operate within the communication network. Once the network device is installed, other network devices within the communication network automatically assume the network device is what it declares itself to be and will begin communicating with it in a trusted fashion. If communications are supported, the other network devices do not care if the network device is an authorized device, operating in an intended portion of the communication network, operating in the intended manner, manufactured by the appropriate vendor, running legitimate software, or the like. Accordingly, the installation of network devices in a communication network is manually intensive and subject to mistake, misuse, or a combination thereof. Appropriate network devices may be installed in the wrong manner or in the wrong place and unauthorized network devices may be installed instead of authorized network devices.

Be it mistake or misuse, there is a need for a technique to readily authenticate network devices that are being connected to and subsequently form part of a communication network. There is a further need to allow network devices to automatically connect to the communication network and authenticate themselves prior to being allowed to function in normal fashion. There is yet a further need to reduce the manual labor associated with installing and connecting a network device to the communication network. The present invention fulfills these needs by employing the use of digital certificates in a unique and effective manner.

SUMMARY OF THE INVENTION

The present invention relates to using digital certificates to allow network devices to authenticate themselves upon being accepted into and forming part of a communication network. For a particular network device, a certificate authority will create and issue a unique digital certificate for the network device. In one embodiment, the digital certificate is issued by a vendor of the product, and in particular a certificate authority associated with the vendor. Further, the digital certificate may have digital certificate information, which may include identification and address information for the network device as well as the network device's public key. The network device's public key is part of a public and private key pair that the network device will use for encrypting communications with other network devices after being connected to the communication network. The network device will maintain its private key in confidence. The digital certificate may also have a digital signature based on the digital certificate information and the certificate authority's private key, which is part of public and private key pair of the certificate authority.

The digital certificate is provided to and stored in the network device. Further, a tag, such as a radio frequency identification (RFID) tag, may be loaded with the digital certificate and physically attached to the network device. Prior to the network device attempting to connect to the communication network, the digital certificate from the tag is provided to the authentication server. The network device will provide the digital certificate directly or indirectly to an authentication server in the communication network upon being connected to the communication network. The authentication server will use the digital certificate to authenticate the network device. During the authentication process for the network device, the authentication server may use the certificate authority's public key to assist in verifying that the digital certificate was signed by the certificate authority, and thus verify that the digital certificate information is authentic, the network device is authentic, or both. Next, at least a portion of the corresponding digital certificates are compared with one another to determine whether the network device should be allowed to connect to the communication network. If the network device is authenticated, the authentication server will allow the network device to join the communication network and operate in its appropriate capacity.

Digital certificates for authentication may be used for network devices at different hierarchical levels in the communication network. A connecting network device at one hierarchical level may connect to a network device at a higher hierarchical level and initiate an authentication process with the authentication server. The connecting device will have a digital certificate issued by the certificate authority and present the digital certificate for the authentication server to facilitate an authentication process upon connecting to the communication network. This process may be repeated for network devices that are connecting to the communication device at each hierarchical level. As such, each of the network devices in the communication network, regardless of its level in the hierarchy, will have a trusted relationship with the communication network and the other devices residing therein.

In one embodiment, assume an access point is at the lowest hierarchical level and the most central network devices, such as core routers, are at the highest hierarchical levels in the overall hierarchy of the communication network. Further, assume that network devices in any given hierarchical level gain access to the core network through network devices that are at the next higher hierarchical level. When network devices are connected to and join the communication network, the network devices at the highest hierarchical level are authenticated using their digital certificates and are allowed to join the communication network first. Second level network devices will connect to one or more highest level network devices and present their digital certificates for authentication to the authentication server. This process will repeat for each level, wherein the access points will connect to network devices at the second-to-lowest hierarchical level and present their digital certificates for authentication to the authentication server. Notably, network devices at any level may connect to the communication network and use their digital certificates for authentication at any time to allow the communication network to grow at different levels as desired.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a block representation of a manufacturing environment according to one embodiment of the present invention.

FIGS. 2A-2B provide a communication flow for allocating digital certificates to network devices according to one embodiment of the present invention.

FIG. 3 is a first configuration of a communication environment according to one embodiment of the present invention.

FIGS. 4A-4B provide a communication flow illustrating an installation process according to one embodiment of the present invention.

FIGS. 7A-7F illustrate network devices at different hierarchical levels connecting to a communication network, authenticating themselves with an authentication server, and joining the communication network if authenticated, according to one embodiment of the present invention.

DETAILED DESCRIPTION OF THE PREFERRED EMBODIMENTS

Figure 1:
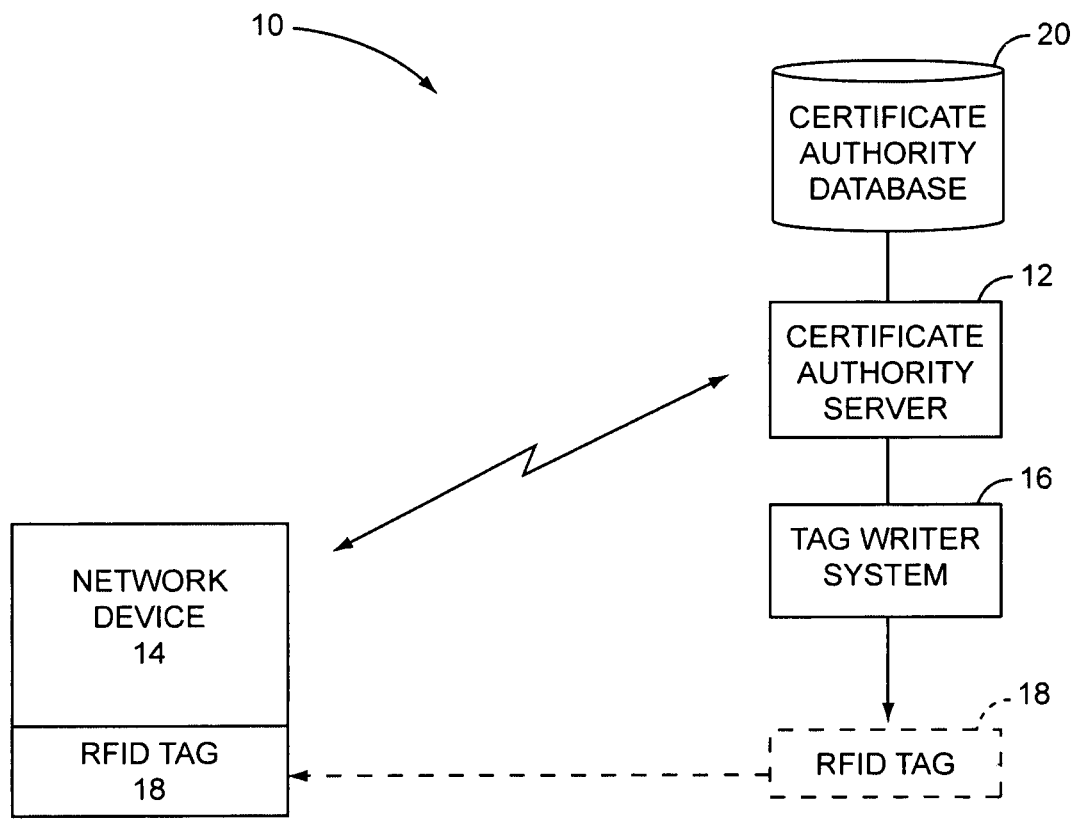

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to using digital certificates to allow network devices to authenticate themselves upon being accepted into and forming part of a communication network. For a particular network device, a certificate authority will create and issue a unique digital certificate for the network device. In one embodiment, the digital certificate is issued by a vendor of the product, and in particular a certificate authority associated with the vendor. Further, the digital certificate may have digital certificate information, which may include identification and address information for the network device as well as the network device's public key. The network device's public key is part of a public and private key pair that the network device will use for encrypting communications with other network devices after being connected to the communication network. The network device will maintain its private key in confidence. The digital certificate may also have a digital signature based on the digital certificate information and the certificate authority's private key, which is part of a public and private key pair of the certificate authority.

The digital certificate is provided to and stored in the network device, which will provide the digital certificate directly or indirectly to an authentication server in the communication network upon being connected to the communication network. The authentication server will use the digital certificate to authenticate the network device. During the authentication process for the network device, the authentication server may use the certificate authority's public key to assist in verifying that the digital certificate was signed by the certificate authority, and thus verify that the digital certificate information is authentic, the network device is authentic, or both. If the network device is authenticated, the authentication server will allow the network device to join the communication network and operate in its appropriate capacity.

Prior to delving into the details of the present invention, an overview of an exemplary manufacturing environment is illustrated in which digital certificates are assigned and provided to network devices prior to the network devices being delivered for installation into a communication network. Also illustrated, is a technique for employing Radio Frequency Identification (RFID) technology that allows network providers to automatically obtain useful information from and related to the network devices upon receiving or commissioning the network devices, without having to activate or otherwise connect the network devices to a network.

With reference to FIG. 1, a manufacturing environment 10 is illustrated according to one embodiment of the present invention. The manufacturing environment 10 includes a certificate authority server 12, which is capable of generating and allocating digital certificates for network devices 14, which are being or have been manufactured. For each network device 14, the certificate authority 12 is preferably associated with the vendor of the network device 14, and will generate a unique digital certificate, which will be described below, and will deliver the digital certificate to the network device 14, such that the network device 14 may store the digital certificate. The digital certificate will be used when the network device 14 is being deployed for use in a communication network. Accordingly, the network device 14 will have the digital certificate, which is provided by the vendor, stored in internal memory. A vendor is preferably a manufacturer or authorized distributor or seller for the network device 14.

In one embodiment, the certificate authority server 12 may also deliver the digital certificate for the network device 14 to a tag writer system 16, which is capable of writing the digital certificate for the network device 14 to an RFID tag 18. The RFID tag 18 may be attached to the housing or other supportive structure of the network device 14. Notably, information in addition to the information provided in the digital certificate may be written to the RFID tag 18, and as such, any information on the RFID tag 18 may be accessed for any number of reasons, including inventory tracking, shipment tracking, and providing provisioning information to assist with connecting and operating the network device 14 in a communication network. By using the RFID tag 18, network providers may automatically read pertinent information about the network device 14 from the RFID tag 18 without having to manually enter the information into the network provider's management systems, as will be described further below.

Continuing with FIG. 1, the certificate authority server 12 may be associated with a certificate authority database 20, which keeps track of existing digital certificates as well as any information necessary for creating or maintaining these digital certificates. A digital certificate will typically include information and a digital signature of the certificate authority, which is based on the digital certificate information. The digital certificate information will carry different forms of information depending on the type of digital certificate being used. In one embodiment, an ITU-T X.509 certificate format is employed. X.509 certificates have several information fields, including:

- a version field, which identifies the version of the certificate format,
- a certificate serial number, which identifies a unique serial number for the certificate,
- a signature algorithm identifier, which identifies an encryption algorithm used for creating the certificate authority's digital signature,
- the certificate authority's name or identification,
- a validity, which defines a period during which the digital certificate is valid,
- a subject name, which identifies the network device,
- subject public-key information, which includes the public key for the subject and an identifier of an encryption algorithm to use with the public key,
- an issuer unique identifier, which uniquely identifies the certificate authority, and
- one or more extension fields, in which various types of information may be provided.

In one embodiment of the present invention, the subject name field is populated with identification information for the network device 14. For example, the subject name field may include the product name, a serial number for the product, and a machine access code (MAC) address that has been assigned to the network device 14. Notably, the serial number and the MAC address are preferably unique to the network device 14, and the MAC address is the address that other network devices will use to communicate with the network device 14, once the network device 14 is connected and operating in a communication network.

When the network device 14 is connected and operating in a communication network, the network device 14 may use a private key of a public and private key pair for communications with other devices in the communication network. The public key of the public and private key pair of the network device 14 is preferably included in the digital certificate, such that the digital certificate may provide at least one mechanism for initially distributing the public key for the network device 14. The network device 14 will maintain its private key in confidence.

As indicated, the public and private key pair associated with the network device 14 is different than the public and private key pair associated with the certificate authority. The certificate authority will maintain its private key in confidence, and will make its public key available publicly, or at least to those entities that will be processing the digital certificates. Accordingly, the public key of the certificate authority is generally not included in the digital certificate. However, the certificate authority will use its private key to create a digital signature for the digital certificate.

Figure 2B:
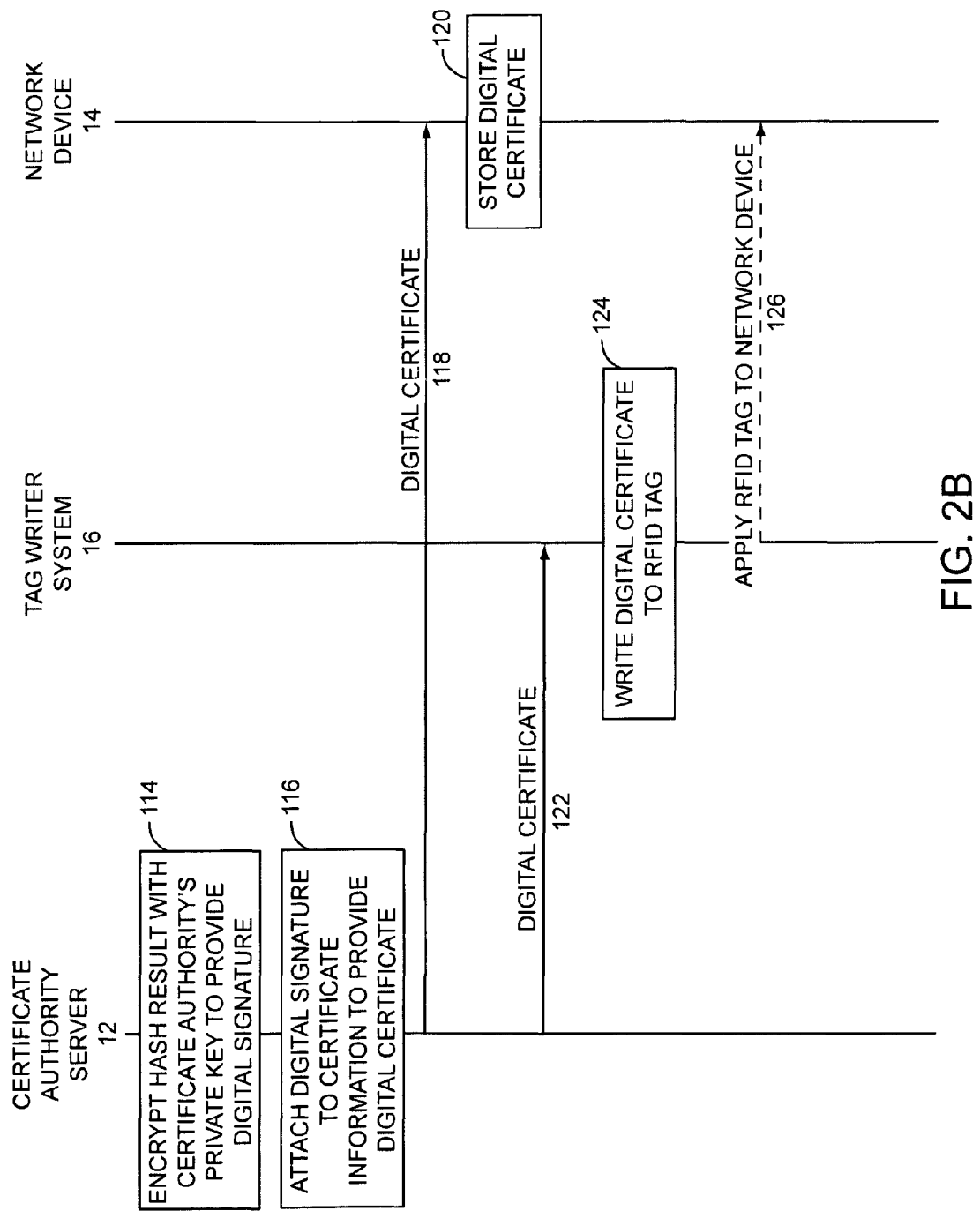

An exemplary process for generating a digital certificate and allocating the digital certificate to a network device 14 is illustrated in the communication flows of FIGS. 2A and 2B. In this embodiment, assume the communication flow is taking place in the manufacturing environment 10 of FIG. 1. Initially, assume the network device 14 is capable of generating its own private key and public key for its public and private key pair (step 100). The network device 14 will store its private key locally (step 102) and access any local information that is needed to be provided to the certificate authority server 12 to facilitate creation of a digital certificate (step 104). The local information may include the network device's product name, public key, serial number, and MAC address. Those skilled in the art will recognize that additional information may be provided by the network device 14 to facilitate creation of the digital certificate. The network device information for the digital certificate is provided by the network device 14 to the certificate authority server 12 through an appropriate wired or wireless communication mechanism (step 106), and the certificate authority server 12 will process and store the network device information (step 108), perhaps in the certificate authority database 20.

The certificate authority server 12 will then gather certificate information for creating the digital certificate for the network device 14 (step 110). The certificate information represents the information that will be provided in the digital certificate, and thus will populate the various fields of the digital certificate. From a portion or all of the certificate information, the certificate authority server 12 will next generate a digital signature, which is based on the certificate information for the digital certificate.

In one embodiment, the certificate authority server 12 will initially process all or a portion of the certificate information with a hashing algorithm to create a hash result of the certificate information for the digital certificate (step 112). The hash result effectively represents a reduced string or like configuration of information, which represents the certificate information. The hash result is then encrypted with the certificate authority's private key to generate the digital signature for the digital certificate (step 114). The digital signature is then attached to the certificate information in an appropriate data entity to provide the digital certificate (step 116). As such, the digital certificate includes the certificate information and a digital signature, which is derived from the certificate information.

The certificate authority server 12 may then provide the digital certificate to the network device 14 (step 118), which will store the digital certificate for future use (step 122). If an RFID tag 18 is to be associated with the network device 14 and include the digital certificate, the certificate authority server 12 may also deliver the digital certificate for the network device 14 to the tag writer system 16 (step 120), which will write the digital certificate to the RFID tag 18 (step 124).

The RFID tag may be applied to a structure or housing of the network device 14 in an automated or manual process (step 126). Notably, the tag need not be an RFID tag 18. For example, the digital certificate may be provided in the form of a bar code or other machine-readable format, wherein the information representing the digital certificate is readily and directly readable by an appropriate device, which will be illustrated in further detail below.

Figure 3:
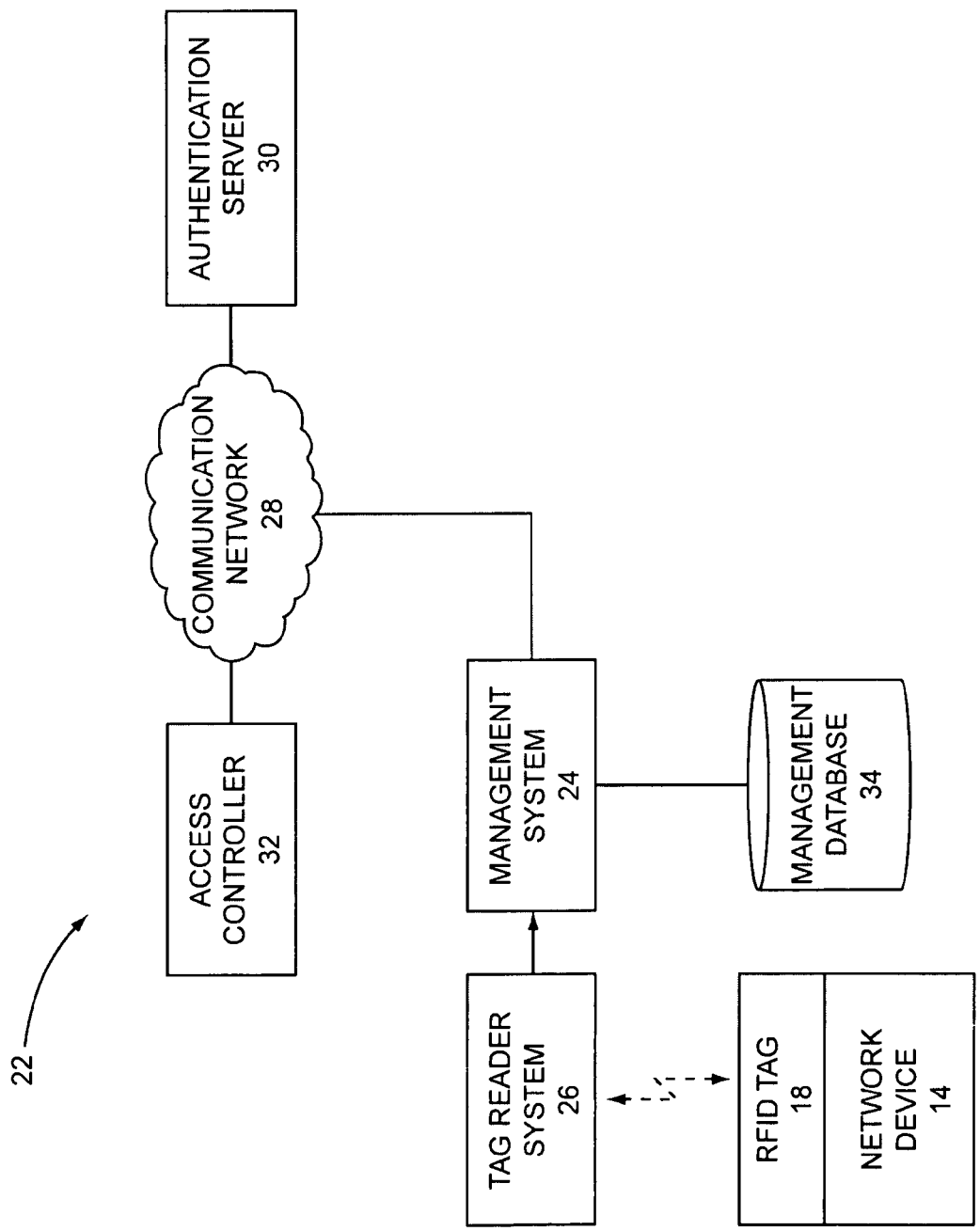

With reference to FIG. 3, a communication network environment 22 is illustrated. The communication network environment 22 is depicted to include a management system 24, which is associated with a tag reader system 26. The management system 24 is generally provided by a network service provider and used to manage a communication network 28, and in particular the devices that form the communication network 28. Accordingly, the management system 24 must keep track of and control when and how devices are added to the network. In certain embodiments, information about the network device 14 must be provided to the management system 24 prior to the network device being connected to the communication network 28. In traditional fashion, the management system 24 must keep track of the various information, including the serial number, MAC address, manufacturer information, capability information, and the like that is associated with the network device 14. Certain of this information may need to be passed to various devices that make up the communication network 28, such as the authentication server 30 and access controller 32, which are depicted in FIG. 3. Throughout this description, the communication network 28 is assumed to include various devices that are used to facilitate communications within the communication network 28, and will also include those devices that facilitate communications between or with user terminals, and are illustrated as being connected to the communication network 28. Thus, the access controller 32 and authentication server 30 are considered devices in the communication network 28; however, a user terminal that gains access to the communication network to facilitate communications via the access controller 32 or other network device is not considered part of the communication network 28. Further detail is provided below.

The management system 24 may be associated with a management database 34 to facilitate the storage and management of information associated with the network device 14, as well as any other devices associated with the communication network 28. In one embodiment, the RFID tag 18 that was attached to the network device 14 during manufacture is used to facilitate the delivery of information about the network device 14 to the management system 24, without the management system 24 having to manually provide the information or having to communicate directly with the network device 14 to obtain this information. As such, the tag reader system 26 may read the information provided in the RFID tag 18 and present the information to the management system 24 for processing and storage in the management database 34. Notably, the RFID tag 18 may include the digital certificate, as well as other information associated with the network device 14. The digital certificate and any other information may be stored in the management database 34 and used by the management system 24 as desired.

Figure 4A:
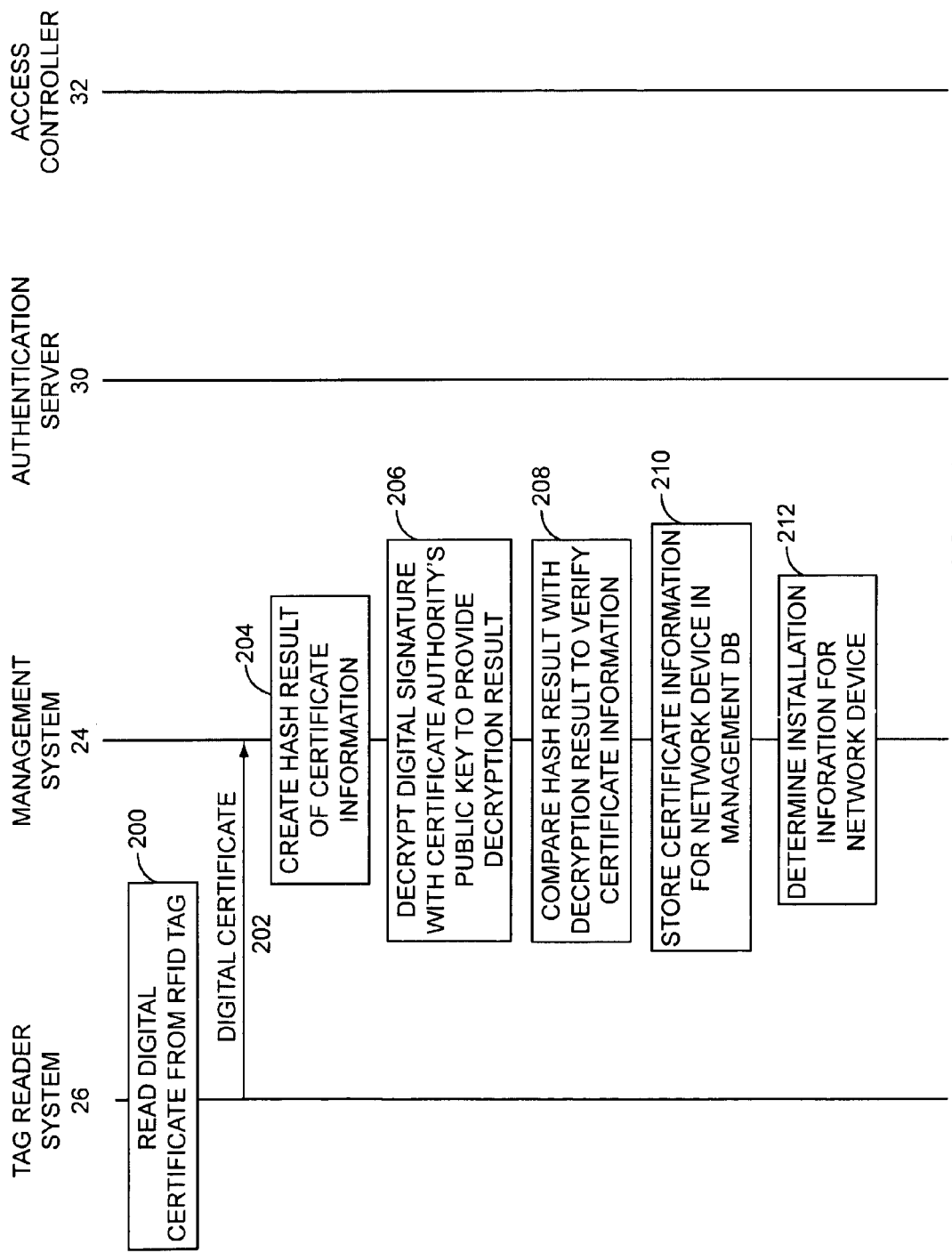

The communication flow of FIGS. 4A and 4B illustrates a technique for allowing the management system 24 to receive the digital certificate and process the digital certificate in a manner sufficient to verify that the certificate information associated with the digital certificate is authentic. Assuming the network device 14 is authenticated by the management system 24, installation information may be generated and provided along with the digital certificate to devices in the communication network 28 that need the information to allow the network device 14 to connect to the communication network 28. In this embodiment, assume that the digital certificate and installation information are generated by the management system 24 after authenticating the network device 14, and pushed to the authentication server 30 and the access controller 32. Further assume that the network device 14 is a wireless access point, which will attach to the communication network 28 via the access controller 32. Accordingly, when the network device 14 is ultimately connected to the communication network 28 via the access controller 32, either the access controller 32, the authentication server 30, or both may use the digital certificate and installation information to control the process of connecting the network device 14 to the communication network 28. In particular, the authentication server 30 may use the digital certificate to authenticate the network device 14 prior to allowing the network device 14 to begin operating in the communication network 28 in a desired fashion.

In one embodiment, the authentication server 30 provides the functionality of a remote authentication dial-in user service (RADIUS) function, which provides centralized access, authorization, and accounting management for devices making up the communication network 28. In essence, the authentication server 30 may initially authenticate the network device 14, and if authenticated, authorize the network device 14 to perform or to operate in a desired fashion. The authentication server 30 will make a record of the network device's access and store the record to fulfill any desired accounting requirements. The communication flow of FIGS. 4A and 4B correspond to the communication environment 22 of FIG. 3.

Initially, assume the tag reader system 26 reads the information from the RFID tag 18, including the digital certificate (step 200). The digital certificate and any other information is passed to the management system 24 (step 202), which will take the necessary steps to verify the digital certificate. To verify the digital certificate, the management system 24 will use a hashing process to create a hash result of the certificate information in the digital certificate (step 204). The hashing process should be the same hashing process used to create the digital signature at the certificate authority server 12. The management system 24 will then decrypt the digital signature of the digital certificate with the certificate authority's public key to provide a decryption result (step 206). The hash result is compared with the decryption result to verify the authenticity of the certificate information in the digital certificate (step 208). The certificate information for the network device 14 is stored in the management database 34 (step 210). The management system 24 may use information provided in the digital certificate, other information provided by the RFID tag 18, and other information retrieved by the management system 24 to determine installation information for the network device 14 (step 212). The installation information may be stored in the management database 34 along with the certificate information for the network device 14 (step 214).

At this point, the management system 24 may deliver all or a portion of the certificate information and the installation information to the authentication server 30 (steps 216 and 218), the access controller 32 (steps 220 and 222), or both. Notably, the digital certificate may or may not be provided to either one of these devices, or any other device in the communication network 28 for that matter, by the management system 24. These decisions may be made at the sole discretion of the service provider. Upon receipt of the digital certificate, the authentication server 30 will verify the authenticity of the digital certificate and effectively recognize the network device 14 as one that is authorized to connect to the communication network 28 (step 224). Additionally, the information provided by the management system 24 to the devices of the communication network 28, and to the access controller 32 and the authentication server 30 in this embodiment, are provided merely to help configure these devices in a way that enables the network device 14 to be subsequently connected to the communication network 28. Accordingly, the access controller 32 and the authentication server 30 may be configured to expect the network device 14 to connect to the communication network 28, understand the capabilities of the network device 14, and understand the functionality that the network device 14 should provide. The management system 24 may also arm these devices with virtually any type of information helpful in authenticating, configuring, and controlling the network device 14 with respect to being connected to and operating as a part of the communication network 28.

Figure 5:
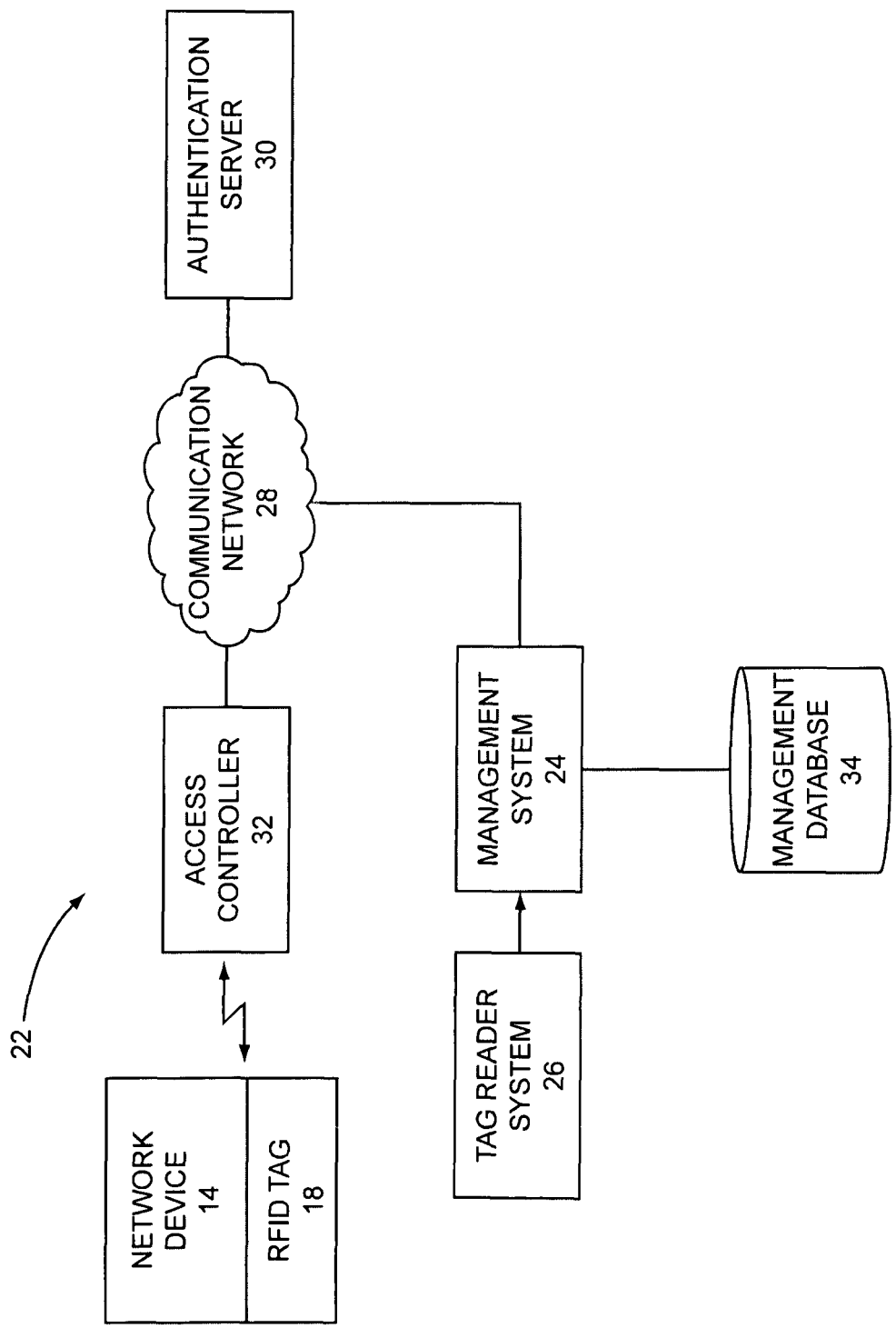
FIG. 5 is a second configuration of a communication environment according to one embodiment of the present invention.

Turning now to FIG. 5, the communication environment 22 depicts the network device 14 being within a wireless communication range of the access controller 32. Again, in the illustrated embodiment, assume that the network device 14 is a wireless access point, which will connect wirelessly with the access controller 32 and provide wireless communication access for various user elements (not shown) to the access controller 32. Accordingly, the network device 14, in an access point configuration, will communicate wirelessly with user elements and with the access controller 32 to facilitate communications between the user elements and the access controller 32.

Figure 6A:
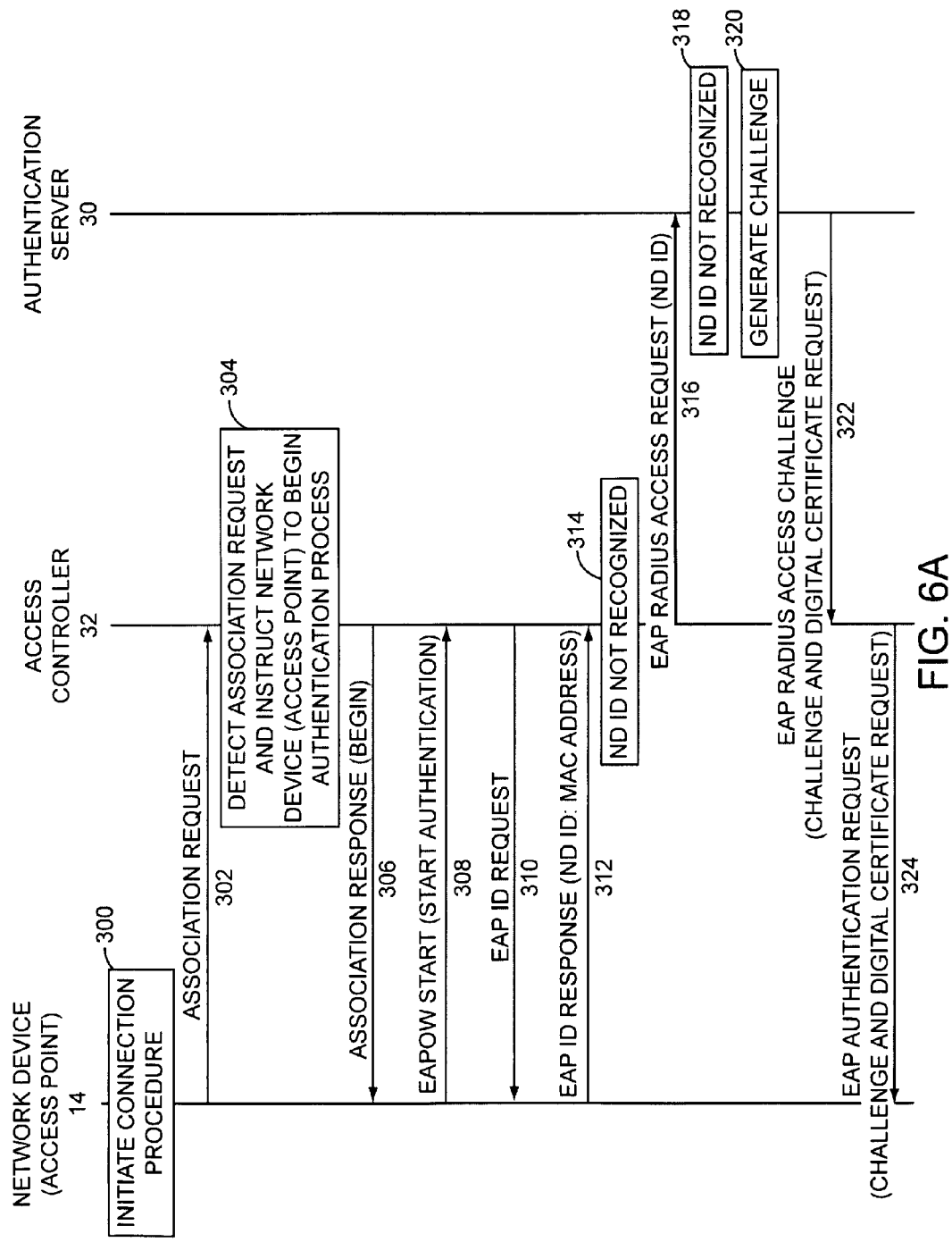
FIGS. 6A-6C illustrate an authentication process according to one embodiment of the present invention.
Figure 6B:
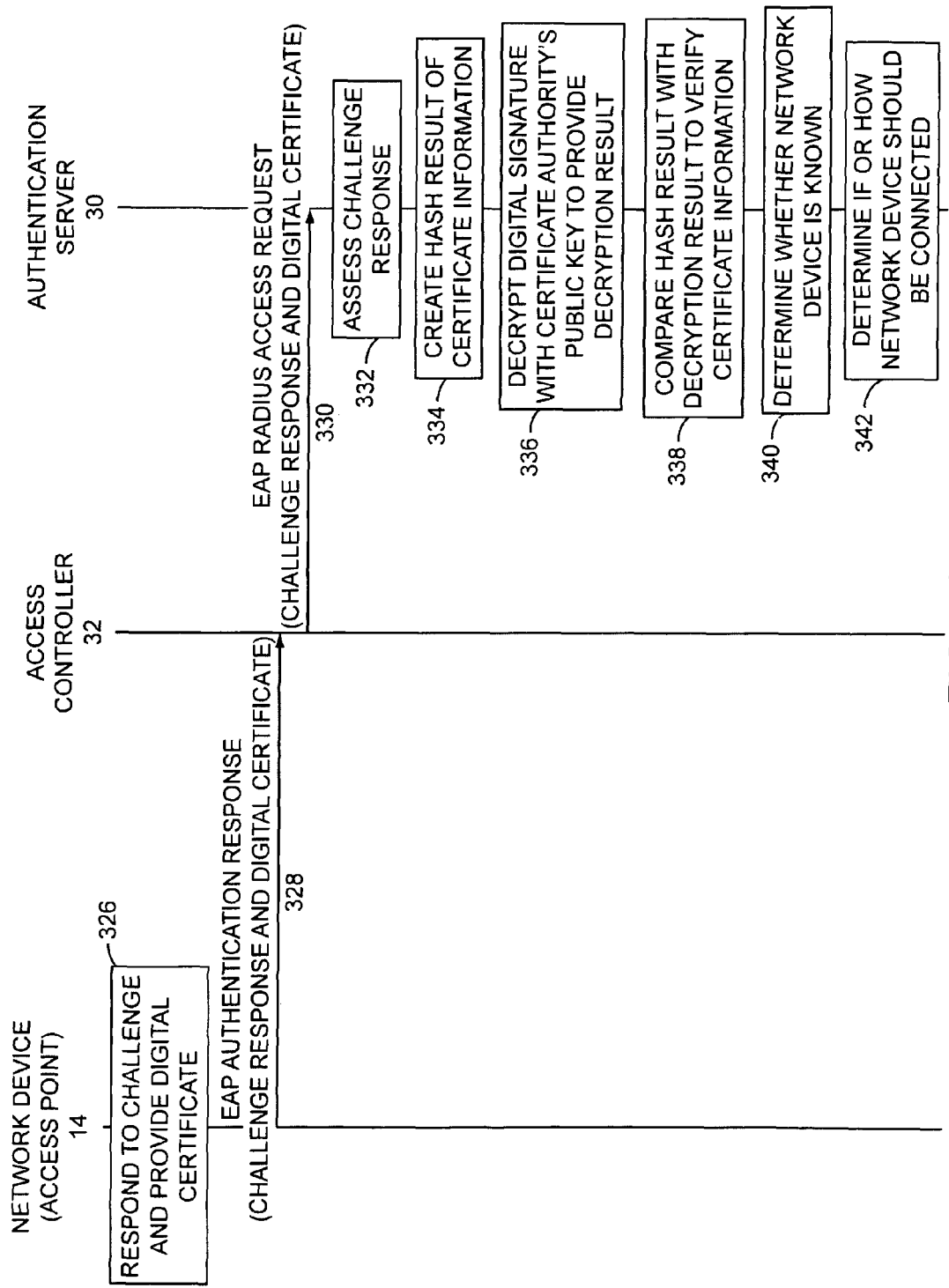
Figure 6C:
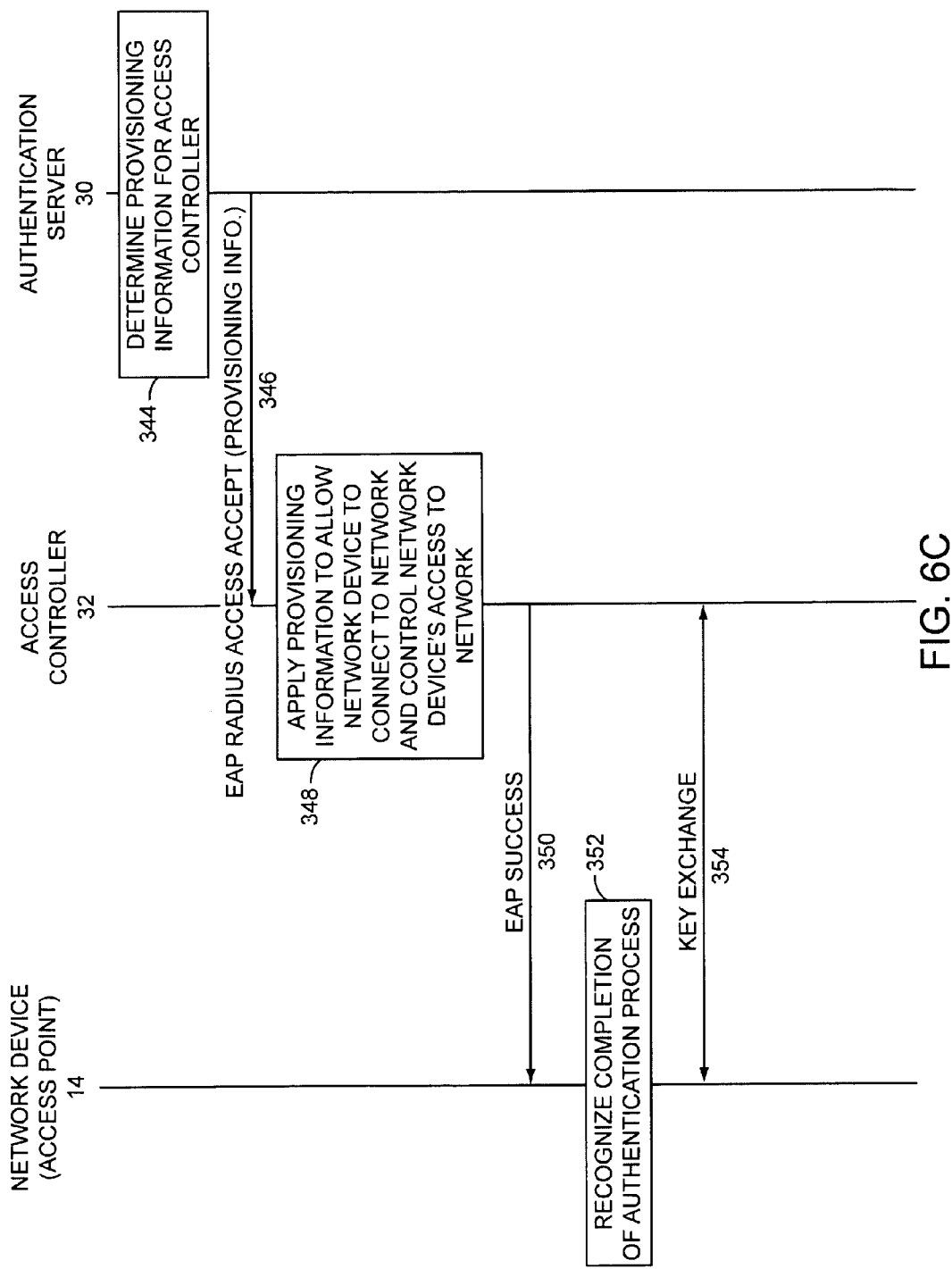

Prior to providing such functionality, the network device 14 must be authenticated by the authentication server 30. An exemplary connection and authentication procedure is illustrated in association with the communication flow of FIGS. 6A-6C. In this communication flow, the network device 14 will provide its digital certificate to the authentication server 30, which will process the digital certificate to determine whether or not the information contained therein is authentic, if the network device 14 is who it claims to be, or both. Once authentication is complete, the authentication server 30 will instruct the access controller 32 to allow the network device 14 to connect to the communication network 28 through the access controller 32. The authentication server 30 will also provide instructions to the access controller 32 to control the nature of access provided to the network device 14 by the access controller 32.

Assume that when the network device 14 is connected to the access controller 32 or comes within wireless communication range of the access controller 32, the network device 14 will initiate a connection procedure (step 300). Assume that the wireless interface between the network device 14 and the access controller 32 is provided by the IEEE 802.11 standard of protocols. Further, assume that the Extensible Authentication Protocol (EAP), which is defined in RFC 2284-PPP Extensible Authentication Protocol (EAP), is the protocol used to control authentication messaging. Those skilled in the art will recognize other authentication protocols that may be used to employ the concepts of the present invention. RFC 2284 is incorporated herein by reference in its entirety.

Upon initiating the connection procedure, the network device 14 will send an association request to the access controller 32 (step 302), which will detect the association request and instruct the network device 14 to begin an authentication process (step 304). Accordingly, the access controller 32 will send an association response to the network device 14 to begin the authentication process (step 306). Using an EAP-over-wireless (EAPOW) start message, the network device 14 will instruct the access controller 32 to start the authentication process (step 308). Assuming the access controller 32 does not fully recognize the network device 14, the access controller 32 will send an EAP ID request message to request the network device 14 to provide identification information (step 310). The network device 14 will respond by sending an EAP ID response message, including its identification information, to the access controller 32 (step 312). In this example, assume that the identification information (ND ID) includes the MAC address for the network device 14. Since the MAC address is generally a unique identifier for the network device 14, the access controller 32 can determine whether or not the MAC address is a recognized address or identification. Assuming the access controller 32 does not recognize the network device ID (MAC address) (step 314), the access controller 32 will send an EAP RADIUS access request message, including the network address ID, to the authentication server 30 via the communication network 28 (step 316).

Again, assuming the authentication server 30 does not recognize the network device ID (step 318), the authentication server 30 will generate a challenge for the network device 14 (step 320), as dictated by the EAP authentication protocol. As such, the authentication server 30 will send an EAP RADIUS access challenge message, including the challenge for the network device 14, to the access controller 32 (step 322). In this embodiment, the EAP RADIUS access challenge will include a request for the digital certificate of the network device 14. The access controller 32 will send the challenge and digital certificate request of the authentication server 30 to the network device 14 in an EAP authentication request message (step 324).

The challenge provided by the authentication server 30 requires the network device 14 to provide a particular response, deemed a challenge response, that is expected by the authentication server 30. The challenge may require the network device 14 to provide certain information about itself, recent communication activities, or the like, which will assist the authentication server 30 in thwarting replay attacks or the like from unauthorized devices. Accordingly, the network device 14 will provide a challenge response and its digital certificate to the access controller 32 in an EAP authentication response message (steps 326 and 328). The access controller 32 will forward the challenge response and the digital certificate to the authentication server 30 in an EAP RADIUS access request (step 330), wherein the authentication server 30 will assess the challenge response (step 332). Assuming the challenge response is appropriate, the authentication server 30 will take the necessary steps to verify the certificate information provided by the digital certificate. Accordingly, the authentication server 30 will provide a hashing process to create a hash result of the certificate information provided in the digital certificate (step 334). Next, the authentication server 30 will decrypt the digital signature with the certificate authority's public key to provide a decryption result (step 336). The hash result is compared with the decryption result to verify the certificate information of the digital certificate (step 338). If the hash result matches the decryption result, the certificate information is deemed authentic.

Based on the information in the certificate information, the authentication server 30 may determine whether the network device 14 should be allowed to connect to the communication network 28 (step 340). Preferably, this is accomplished by comparing the certificate information of the digital certificate that was previously provided by the management system 24 to the certificate information of the digital certificate provided by the network device 14. If the digital certificates are the same, then the network device 14 is permitted entry into the communication network 28. Assuming that the authentication server 30 has been manually or automatically provisioned, as illustrated above, to include information indicating that the network device 14 will be connected to the communication network 28, the authentication server 30 will proceed with connection procedures. In certain embodiments, the authentication server 30 will also determine how the network device 14 should be connected to the communication network 28, and in this example, to the access controller 32 (step 342). This step may be important in situations where an authorized network device 14 is accidentally connected to the communication network 28 in the wrong location or in the wrong way. Accordingly, the authentication server 30 may detect mistakes in placement and configuration of the network device 14, even if the network device 14 is an authorized device for the overall communication network 28.

Assuming that the network device 14 is recognized and is being connected in the right location, the authentication server 30 may then determine the necessary provisioning information for the access controller 32 to use when controlling the network device's access to the communication network 28 (step 344). The provisioning information may not only provide instructions for the access controller 32 to use when controlling the network device 14, but it may also provide an Internet Protocol (IP) address or any other information that the network device 14 may need to connect to the communication network 28 and operate in a desired fashion. The provisioning information may be delivered to the access controller 32 via an EAP RADIUS access accept message (step 346), which informs the access controller 32 that the network device 14 should be allowed to connect to the communication network 28 via the access controller 32. The access controller 32 will extract the provisioning information and apply the provisioning information to allow the network device 14 to connect to the communication network 28 and control the network device's access to the communication network 28 (step 348). The access controller 32 will then send an EAP success message to the network device 14 to indicate that the network device 14 has been accepted into the communication network 28 by the authentication server 30 (step 350).

The network device 14 will recognize completion of the authentication process (step 352), and continue with the connection process to the communication network 28. In this example, the network device 14 may coordinate with the access controller 32 to exchange any encryption keys necessary to facilitate communications over the wireless link between the network device 14 and the access controller 32 (step 354), and proceed with normal operation, wherein the network device 14 is considered a part of the communication network 28.

From the above, the present invention employs digital certificates to allow network devices 14 to effectively authenticate themselves upon being accepted into and forming a part of the communication network 28. In another embodiment, network devices 14 at different hierarchical levels within the communication network 28 will each be allocated digital certificates and will use the digital certificates upon being accepted into and forming part of the communication network 28. The most central network devices 14, which form the innermost core of the network, will join the communication network 28 first. These network devices 14 will present their digital certificates to the authentication server 30 for authentication before being allowed to form part of the communication network 28. The next hierarchical layer of network devices 14 will also be allocated digital certificates, which are presented to the authentication server 30 prior to being accepted into the communication network 28. The network devices 14 for the second hierarchical layer may directly connect to the higher layer network devices 14 to gain access to the communication network 28. Accordingly, network devices 14 will systematically connect to the communication network 28 and use their digital certificates to authenticate themselves, in a systematic and hierarchical fashion.

This concept is graphically illustrated in FIGS. 7A-7F. In these figures, assume a basic portion of the communication network 28 exists and is served by the authentication server 30. Further assume that core routers 36 are associated with the highest hierarchical level, Level 1 (L1). Accordingly, core routers 36 will connect to the communication network 28, provide their digital certificates to the authentication server 30 for authentication, and assuming they are authenticated, are allowed to form part of the communication network 28 (FIG. 7A). The communication network 28 may include numerous core routers 36 at the hierarchical level Level 1.

At a second hierarchical level, Level 2 (L2), aggregation routers 38 reside. The aggregation routers 38 will connect to an appropriate core router 36 when connecting to the communication network 28, provide their digital certificates to the authentication server 30 for authentication, and if authenticated, are allowed to join the communication network 28 (FIG. 7B). If access routers 40 reside at a third hierarchical level Level 3 (L3), the access routers 40 will connect to the communication network 28 via the aggregation routers 38, provide their digital certificates to the authentication server 30 for authentication, and if authenticated, the access routers 40 are allowed to join the communication network 28 (FIG. 7C). If an access controller 32 resides at the fourth hierarchical level, Level 4 (L4), the access controller 32 will connect to the communication network 28 via an access router 40, provide its digital certificate to the authentication server 30 for authentication, and if authenticated, is allowed to join the communication network 28 (FIG. 7D).

Finally, assume that the network device 14 is an access point that is configured to access the communication network 28 via the access controller 32. In this instance, the network device 14 will connect to the access controller 32, provide its digital certificate to the authentication server 30, and if authenticated, will join the communication network 28 (FIG. 7E). Accordingly, access points (network devices 14), access controllers 32, access routers 40, aggregation routers 38, and core routers 36 form part of the communication network 28 and represent devices at different hierarchical levels within the communication network 28. The overall communication network 28 will facilitate communications among various user elements 42 that may gain access to the communication network 28 via an appropriate access point (network device 14) and communicate with other user elements 42 in traditional fashion.

In this embodiment, network devices 14 at different hierarchical levels are authenticated prior to being allowed to join the communication network 28. Further, these devices effectively join the communication network 28 in a systematic fashion, wherein network devices 14 that reside at higher hierarchical levels will connect to the communication network 28, authenticate themselves, and join the communication network 28 before network devices 14 that reside at lower hierarchical levels join the communication network 28 in a similar fashion. As such, the communication network 28 is allowed to effectively grow in a secure fashion from the inside out, wherein each of the network devices 14 within the communication network 28 is authenticated prior to becoming part of the communication network 28. Again, each authentication procedure may employ the use of a digital certificate, as described above in association with the connection of a network device 14, in the form of an access point, to the communication network 28.

Figure 8:
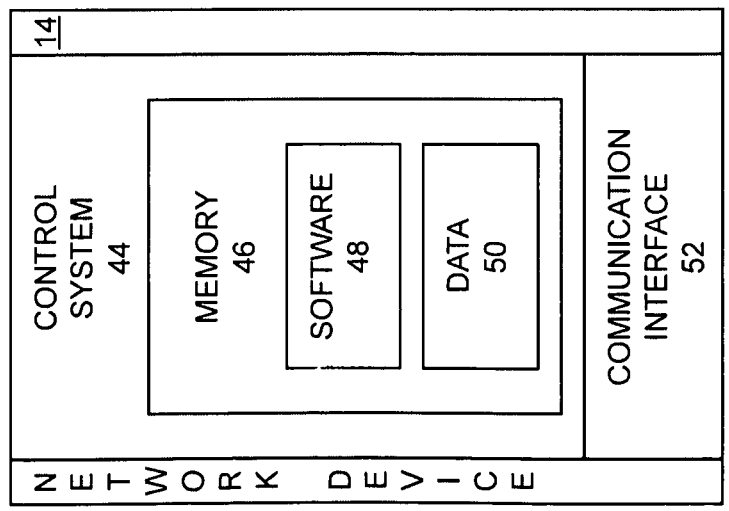
FIG. 8 is a block representation of a network device according to one embodiment of the present invention.

Turning now to FIG. 8, a block representation of a network device 14 is illustrated according to one embodiment of the present invention. The network device 14 may include a control system 44 associated with the requisite memory 46 to support the software 48 and data 50 required to operate as described above. As indicated above, the network device 14 may take on various forms and may represent various types of devices found within the communication network 28. As illustrated above, the network device 14 may take the form of an access point, access controller 32, access router 40, aggregate router 38, core router 36, and the like. These examples are merely illustrative of the different types of devices that the network device 14 may represent, and should not limit the interpretation of a network device 14. The control system 44 may also be associated with a communication interface 52 to facilitate communications with other network devices 14, and perhaps user elements 42, if the network devices 14 provide an access point or entry point for the user elements 42 to the communication network 28.

Figure 9:
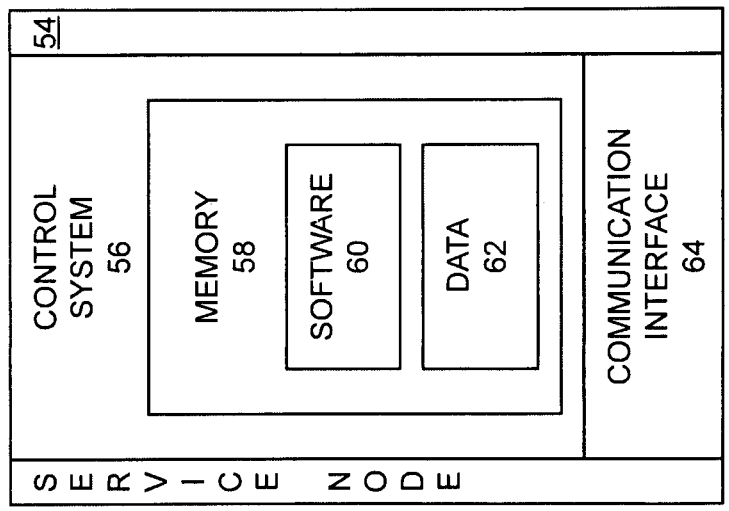
FIG. 9 is a block representation of a service node according to one embodiment of the present invention.

FIG. 9 illustrates a service node 54, which may represent an authentication server 30 or other network component. The service node 54 will include a control system 56 having sufficient memory 58 to support the requisite software 60 and data 62 to operate as desired. The control system 56 may be associated with a communication interface 64 to facilitate communications with the various network devices 14, as described above. In addition to being able to provide the functionality of an authentication server 30, the service node 54 may act as a management system server that is employed in the management system 24.

Figure 10:
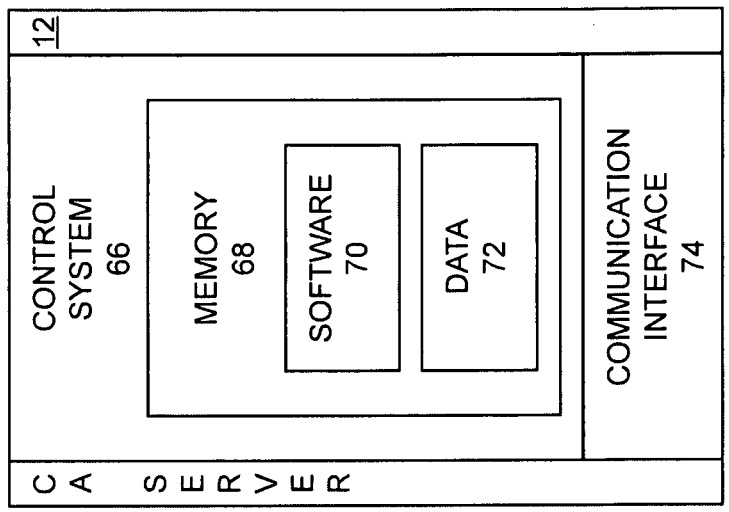
FIG. 10 is a block representation of a certificate authority server according to one embodiment of the present invention.

FIG. 10 illustrates a block representation of a certificate authority (CA) server 12 according to one embodiment of the present invention. The CA server 12 may include a control system 66 having sufficient memory 68 for the requisite software 70 and data 72 to operate as described above. The control system 66 may also be associated with a communication interface 74 to facilitate communications with the network devices 14 as well as other entities in the manufacturing environment 10 or communication environment 22 in a direct or indirect fashion. For any of the above embodiments, the connections between the various network devices 14 as well as between a network device 14 and a user element 42, may be wired, wireless, or a combination thereof.

Those skilled in the art will recognize improvements and modifications to the preferred embodiments of the present invention. All such improvements and modifications are considered within the scope of the concepts disclosed herein and the claims that follow.

What is claimed is:

1. A method for authenticating network devices that form part of a communication network comprising:

receiving, at an access controller, a first digital certificate associated with a network device from a management system that obtained the first digital certificate from a tag applied to the network device;

receiving, at the access controller, a second digital certificate associated with the network device from the network device requesting to become part of a communication network;

verifying, via the access controller, authenticity of the second digital certificate associated with the network device;

determining, via the access controller, whether the network device should be allowed to become part of the communication network based on a comparison of at least a portion of the first digital certificate received from the management system and the second digital certificate associated with the network device; and allowing, via the access controller, the network device to become part of the communication network when the determination that the network device should be allowed to become part of the communication network is made.

2. The method of claim 1 wherein the second digital certificate associated with the network device is a public key digital certificate.

3. The method of claim 2 wherein the second digital certificate associated with the network device is signed with a digital signature of a certificate authority, wherein the second digital signature is provided using a private key of the certificate authority, and the method further comprising accessing a public key of the certificate authority wherein the authenticity of the second digital certificate associated with the network device is verified using the public key of the certificate authority.

4. The method of claim 3 wherein verifying the authenticity of the second digital certificate associated with the network device comprises:
hashing digital certificate information of the second digital certificate associated with the network device to provide a hash result;
decrypting the digital signature with the public key of the certificate authority to provide a decryption result; and
comparing the hash result with the decryption result, wherein the authenticity of the digital certificate associated with the network device is verified when the hash result corresponds to the decryption result.

5. The method of claim 1 wherein the second digital certificate associated with the network device is initially assigned to the network device by a vendor of the network device, and is issued to the network device by a certificate authority associated with the vendor of the network device.

6. The method of claim 1 wherein the second digital certificate associated with the network device includes digital certificate information comprising a public key for the network device.

7. The method of claim 6 wherein the public key for the network device is initially generated by the network device and provided to a certificate authority, which provided the public key for the network device in the digital certificate information used for the second digital certificate associated with the network device.

8. The method of claim 1 wherein the second digital certificate associated with the network device includes digital certificate information comprising identification information for the network device.

9. The method of claim 1 wherein the second digital certificate associated with the network device includes digital certificate information comprising a communication address for the network device.

10. The method of claim 1 wherein the second digital certificate associated with the network device includes digital certificate information comprising a machine access control (MAC) address for the network device.

11. The method of claim 1 wherein the second digital certificate associated with the network device is an International Telecommunication Union (ITU) X.509 certificate.

12. The method of claim 1 wherein the second digital certificate associated with the network device is received via at least one other network device through which the network device communicates to connect to the communication network.

13. The method of claim 12 further comprising providing instructions to the at least one other network device to control access of the network device to the communication network.

14. The method of claim 12 wherein allowing the network device to become part of the communication network comprises providing instructions to the at least one other network device to indicate that the network device can become part of the communication network.

15. The method of claim 12 further comprising requesting the network device to provide the second digital certificate associated with the network device upon determining that the network device is requesting to the become part of the communication network via the at least one other network device.

16. The method of claim 1 wherein the tag is a radio frequency identification (RFID) tag.

17. The method of claim 1 further comprising determining where the network device should be connected in the communication network based on information associated with the second digital certificate associated with the network device.

18. The method of claim 1 wherein the second digital certificate associated with the network device comprises information identifying the network device, and the information identifying the network device is used to determine if the network device is recognized as a device to allow to become part of the communication network.

19. The method of claim 1 wherein the network device is a higher level network device in a hierarchy of device levels and further comprising, after the higher level network device is allowed to become part of the communication network:
receiving a third digital certificate being associated with a lower level network device that is requesting to become part of the communication network, the lower level network device being at a lower level than the higher level network device in the hierarchy of device levels;
verifying authenticity of the third digital certificate;
authenticating the lower level network device based on the authenticity of the third digital certificate; and
allowing the lower level network device to become part of the communication network upon being authenticated.

20. The method of claim 19 wherein a plurality of network devices at a plurality of different levels in the hierarchy of device levels are allowed to become part of the communication network only after corresponding ones of digital certificates associated with the plurality of network devices are authenticated.

21. An authentication system for authenticating network devices that form part of a communication network comprising:
at least one communication interface; and
an access control system having a processor and memory, the access control system being associated with the at least one communication interface and adapted to:
receive a first digital certificate associated with a network device from a management system that obtained the first digital certificate from a tag applied to the network device;
receive a second digital certificate associated with the network device from the network device requesting to become part of a communication network;
verify, via the processor, authenticity of the second digital certificate associated with the network device;
determine, via the processor, whether the network device should be allowed to become part of the communication network based on a comparison of at least a portion of the first digital certificate received from the management system and the second digital certificate associated with the network device; and allow the network device to become part of the communication network when the determination that the network device should be allowed to become part of the communication network is made.

22. The authentication system of claim 21 wherein the second digital certificate associated with the network device is a public key digital certificate.

23. The authentication system of claim 21 wherein the second digital certificate associated with the network device is initially assigned to the network device by a vendor of the network device, and is issued to the network device by a certificate authority associated with the vendor of the network device.

24. The authentication system of claim 23 wherein the second digital certificate associated with the network device is signed with a digital signature of the certificate authority, wherein the digital signature is provided using a private key of the certificate authority, and the access control system is further adapted to access a public key of the certificate authority wherein the authenticity of the second digital certificate associated with the network device is verified using the public key of the certificate authority.

25. The authentication system of claim 21 wherein the second digital certificate associated with the network device comprises information identifying the network device, and the information identifying the network device is used to determine if the network device is recognized as a device to allow to become part of the communication network.

26. The authentication system of claim 21 wherein the second digital certificate associated with the network device is received via at least one other network device through which the network device communicates to connect to the communication network.

27. The authentication system of claim 26 further comprising providing instructions to the at least one other network device to control access of the network device to the communication network.

28. The authentication system of claim 26 wherein allowing the network device to become part of the communication network comprises providing instructions to the at least one other network device to indicate that the network device can become part of the communication network.

* * * * *